(12) United States Patent
Horn

(10) Patent No.: US 7,717,056 B2
(45) Date of Patent: May 18, 2010

(54) SYSTEM AND METHOD FOR COATING TUBES

(75) Inventor: Michael J. Horn, Dedham, MA (US)

(73) Assignee: Plastocor, Inc., Hingham, MA (US)

( * ) Notice: Subject to any disclaimer, the term of this patent is extended or adjusted under 35 U.S.C. 154(b) by 0 days.

(21) Appl. No.: 11/155,462

(22) Filed: Jun. 17, 2005

(65) Prior Publication Data

US 2006/0068092 A1    Mar. 30, 2006

Related U.S. Application Data

(60) Provisional application No. 60/580,930, filed on Jun. 18, 2004, provisional application No. 60/637,879, filed on Dec. 20, 2004, provisional application No. 60/637,789, filed on Dec. 20, 2004.

(51) Int. Cl.
*B05C 7/08* (2006.01)
(52) U.S. Cl. .............................. 118/215; 118/DIG. 10; 118/DIG. 13; 134/166 C; 15/104.061
(58) Field of Classification Search ................ 118/215, 118/317, 408, DIG. 10, DIG. 13; 427/230, 427/235; 15/104.061; 4/255.01; 134/166 C, 134/24, 8
See application file for complete search history.

(56) References Cited

U.S. PATENT DOCUMENTS

| | | | | |
|---|---|---|---|---|
| 2,188,959 A | * | 2/1940 | Schaer | 15/104.061 |
| 3,056,156 A | * | 10/1962 | Immel | 15/104.061 |
| 3,598,636 A | | 8/1971 | Honeycutt, Jr. | |
| 4,069,535 A | | 1/1978 | Cato | |
| 4,335,677 A | | 6/1982 | Nagata et al. | |
| 4,368,219 A | | 1/1983 | Nagata et al. | |
| 4,413,370 A | * | 11/1983 | Payne et al. | 15/104.061 |
| 4,421,790 A | | 12/1983 | Nagata et al. | |
| 4,425,385 A | | 1/1984 | Coulter et al. | |
| 4,427,034 A | | 1/1984 | Nagata et al. | |
| 4,475,629 A | | 10/1984 | Jonnes | |
| 4,548,258 A | | 10/1985 | Nelson et al. | |
| 4,774,905 A | * | 10/1988 | Nobis | 118/304 |
| 5,230,842 A | | 7/1993 | Munde | |
| 5,326,400 A | * | 7/1994 | Sagawa | 118/105 |

(Continued)

FOREIGN PATENT DOCUMENTS

EP    0 713 048    5/1996

(Continued)

OTHER PUBLICATIONS

Horn, M.J., et al., "Condenser Tube Coating as a Means of Life Extension and Performance Enhancement," 1996 *EPRI Condenser Technology Conference*.

*Primary Examiner*—Laura Edwards
(74) *Attorney, Agent, or Firm*—McCormick, Paulding & Huber LLP

(57) ABSTRACT

The present invention relates to coating of tubes, and more particularly to a system and method for coating and/or renovating deteriorated or pitted tubes to extend tube life and enhance performance. Using this system and method a thin coating is applied to the interior of a tube such that the coating is uniform in thickness and covers all regions of the tube. The coating material may be selected to minimize changes in heat transfer or may be selected to provide for the change in working fluid within the tube such that the working fluid does not negatively interact with the tube material.

9 Claims, 6 Drawing Sheets

U.S. PATENT DOCUMENTS

| | | |
|---|---|---|
| 5,544,698 A | 8/1996 | Paulman |
| 5,625,917 A * | 5/1997 | Hawkins ................ 15/104.061 |
| 5,709,503 A | 1/1998 | Manlow |
| 5,879,456 A | 3/1999 | Curran |
| 5,911,828 A | 6/1999 | Curran |
| 5,924,913 A | 7/1999 | Reimelt |
| 6,117,242 A | 9/2000 | Kreiselmaier |
| 6,145,150 A | 11/2000 | Knapp |
| 6,263,534 B1 * | 7/2001 | McCann et al. ............... 15/3.5 |
| 6,739,950 B1 | 5/2004 | Kruse |
| 6,755,916 B1 * | 6/2004 | Pruett ........................... 134/8 |

FOREIGN PATENT DOCUMENTS

| | | | |
|---|---|---|---|
| EP | 0 793 050 | 3/1997 | |
| FR | 2 728 652 | 6/1996 | |
| JP | 62-191077 * | 8/1987 | ................ 118/408 |
| JP | 04 092187 | 3/1992 | |
| JP | 09-201560 | 8/1997 | |
| JP | 2001-191045 | 7/2001 | |
| JP | 2003-284989 | 10/2003 | |
| SU | 1648872 * | 5/1991 | |

* cited by examiner

SYSTEM AND METHOD FOR COATING TUBES

RELATED APPLICATION

This application claims priority to, and the benefit of, U.S. Provisional Application No. 60/637,879, filed on Dec. 20, 2004, U.S. Provisional Application No. 60/637,789, filed on Dec. 20, 2004 and U.S. Provisional Application No. 60/580,930, filed on Jun. 18, 2004, for all subject matter common to these applications. The disclosures of the above-mentioned applications are hereby incorporated by reference herein in their entirety.

FIELD OF THE INVENTION

The present invention relates to coating of tubes, and more particularly to a system and method for coating and/or renovating deteriorated or pitted tubes to extend tube life and enhance performance.

BACKGROUND OF THE INVENTION

Metal tubes have many different applications across a broad spectrum of industrial uses. One example use of metal tubes is in heat exchanger configurations. Fluids or gases running through and over the tubes in the heat exchanger provide heating or cooling as desired. One such heat exchanger application is in the form of a condenser. A condenser is generally utilized to cool steam as it passes over the heat exchanger tubes, which have cooling water passing therethrough. Corrosion, deterioration, erosion, pitting, and fouling of condenser tubes can play a major role in the effectiveness of the heat exchanger apparatus. In addition, maintenance costs, water, chemistry, replacement costs, and down time for repair, are other issues that relate to the performance of the tubes in the condenser or heat exchanger.

The purpose of the tubes in heat exchanger configuration is to provide a barrier between the cooling media (in the form of water, most often) and the heated fluid, and to facilitate heat transfer. Over the course of time, the inner surfaces of the tubes can pit or erode, and eventually may begin to leak and cease to be an effective barrier.

In an effort to prevent or delay the formation of pits or erosion within the tubes, epoxy coatings and other rebuilding compounds have been used. In particular, coatings have been used to protect tube interiors of copper based alloys at the inlet end where water turbulence in conjunction with entrained solids can cause accelerated erosion damage. Coatings extending three inches to twenty four inches into the tube have been successful in preventing degradation in this area.

In addition, more recent approaches have involved coating the entire length of the tubes. Since coatings often significantly reduce fouling and corrosion of the inner surfaces of the tubes, long term performance of coated tubes can ultimately be better than uncoated tubes. One potential side effect associated with the use of coatings is the extent to which heat transfer varies with different characteristics relating to the coatings. Various factors will affect how a coating affects heat transfer, such as but not limited to thermal conductivity of the coating, interface effects between coating and tube, interface effects between multiple coatings, laminar flow effects, fouling effects and applied thickness. The thermal conductivity of the coating is a factor of the resin and filler blend in addition to how well integrated the resin and filler blend are to the other. Interface effects are a function of coating wettability and application parameters, such as temperature, humidity, dust control, and number of coats. In addition, the applied thickness of the coating varies with the number of coats. More specifically, conventionally two coats have been applied to the interior portions of the tubes, however, one coat is preferable because of the reduced thickness and reduced material costs. A full length tube coating currently is typically applied using a spraying process resulting in a coating thickness on the order of 2 mils to 5 mils. Such a thickness can penalize heat transfer capabilities, reducing them in the range of 15%-38% before fouling factors are considered.

Once tubes are placed into service in a heat exchanger they develop protective oxide layers and begin to foul. If the fouling rate is rapid, then tube performance can degrade quickly. Depending on the design cleanliness assumptions and available capacity of tubes, such degradation of performance is tolerable to a certain extent until such time as the heat exchanger must be cleaned or the tubes ultimately replaced. Coatings can prevent formation of oxides and also reduce the rate at which fouling occurs.

A significant concern relating to the degradation of heat transfer characteristics and overall performance of heat transfer tubes relates to the effect of pin holes or pitting due to corrosion of the inner surface of the tube. Currently, common materials utilized for tubes include copper alloys, stainless steel alloys, and titanium alloys, and carbon steel. These tubes work by forming passive films in their intended service. When the passive film breaks down, corrosion occurs. Coatings placed on the inner surface of the tubes can obviate the need for a passivation layer to form.

SUMMARY OF THE INVENTION

There is a need for an improved system and method relating to the application of a coating to the inner surface of tubes to both provide a protective coating and repair or renovate corroded or pitted inner tube surfaces. The present invention is directed toward further solutions to address this need.

In accordance with one aspect of the present invention, a pig device for use in the application of a coating material to a tube includes a main body portion. A coating applicator is disposed at a first end of the main body portion. An end flange is disposed at a second end of the main body portion. The coating applicator is configured to distribute the coating material onto the tube, and the end flange is configured to wipe excess coating material from the tube, to result in a coating formed on an inner surface of the tube.

In accordance with aspects of the present invention, the pig device is configured to be blown through the tube using a propellant. The coating applicator and the end flange are configured to apply an epoxy-based coating. The surface of the pig device is modified to control application of the coating material.

In accordance with one embodiment of the present invention, a method of coating an inner surface of a tube includes providing coating material in the tube. A pig device is provided in the tube, positioned to push the coating material through the tube. The pig device is propelled through the tube to apply the coating material to form a coating.

In accordance with one embodiment of the present invention, a system, method and device for coating an inner surface of a tube is provided wherein a pig device is motivated along the length of the tube using a propulsion mechanism. This propulsion mechanism may take numerous forms, including a pressure differential or a mechanical means. Following propulsion of this pig device through the tube a coating is thereby provided along the inner surface of the tube. This applied coating may be of uniform thickness and may have a minimal effect on the heat transfer characteristics of the tube. This applied coating may fill eroded elements in the tube, renovate regions of the tube which have deteriorated, span and bridge cracks in the tube or may serve to provide a uniform coating along the interior surfaces of the tube wherein the tube material is encapsulated.

In accordance with one embodiment of the present invention, the pig device utilized in applying a coating may be configured such that the coating applicator is manufactured from a compressible material or in the alternative the coating applicator may be manufactured from an incompressible material. The compressible coating applicator, in one embodiment, may be sized such that upon application of a propulsion mechanism to the pig device the coating applicator compresses. In another embodiment, the incompressible coating applicator may further contain a plurality of ridges and ribs associated with the coating applicator.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

Figure 1A:
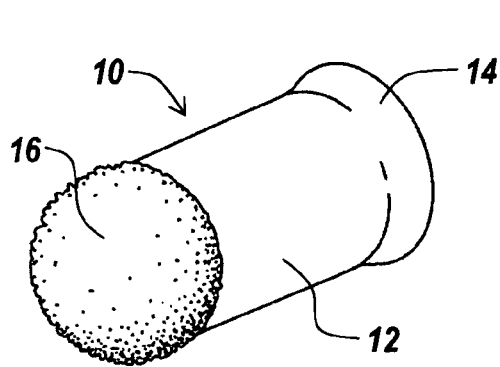
FIG. 1A is a perspective view of a pig device, according to one aspect of the present invention.

An illustrative embodiment of the present invention relates to a system and method for coating and/or renovating the inner surface of a pipe or tube, such as a heat exchanger tube. The system and method involve providing a pig device configured to be inserted into the tube with a selected quantity of coating material. The pig device is pushed through the tube with compressed air. While the pig device travels along the inner surface of the tube, the pig device transports the coating material and applies the coating material to the inner surface of the tube to form a coating. If there are pits or other deterioration or erosion elements on the inner surface of the tube, the coating fills in such elements to repair or renovate the tube surface. The pig device can be used in on-site applications where the heat exchanger tubes are in their installed configuration. Alternatively, the tubes can be coated using the same device and process in a manufacturing setting where the tubes are being fabricated for eventual installation into a heat exchanger, or for some other application requiring a coated tube.

FIGS. 1 through 7F, wherein like parts are designated by like reference numerals throughout, illustrate an example embodiment of a system and method for applying coatings and/or repairing inner surfaces of tubes according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

Pigging technology falls under the genres of fluid mechanics, pipeline technology, and chemical engineering. A general definition of pigging is the propulsion through a pipe of a mobile plug pig which can execute certain activities inside the pipe or tube. Pigging can be used, for example, to clean a pipe mechanically using brushes, or to check the interior condition of the pipe or tube using a video camera. In pigging, the contents of a pipeline are pushed by a snug-fitting plug, known as the pig, with the goal of removing the contents almost completely from the pipeline. The pig is propelled through the pipe by a gas or a liquid propellant. The pig can be spherical, elongated, or composed of several parts. The pig is oversized relative to the pipe; thus, the pipe is sealed in front of and behind the pig. This enables the pig to be driven through the pipe by the gas or liquid propellant. The gas most frequently used is compressed air, and the liquid can be water or a cleaning agent or product.

It should be noted that the following description uses a heat exchanger as an example configuration for tubes that may require the functionality of the present invention. However, one of ordinary skill in the art will appreciate that heat exchanger tubes are merely one example application of tube structures having fluids flowing therethrough that may require a coating or a repair of the inner tube surface. Accordingly, the present invention is not limited to use with heat exchanger tubes, but can be used on a number of different types of tubes in a number of different configurations and having a number of different functions. The end result of the implantation of the present invention is that of a coated and/or repaired or renovated inner tube surface. As such, the invention is anticipated to be utilized in any application that may require such services.

FIG. 1A is a perspective illustration of a pig device 10 in accordance with one embodiment of the present invention. The pig device 10 is generally cylindrical in shape, as illustrated, for use in a normally configured cylindrical tube. However, one of ordinary skill in the art will appreciate that the cylindrical shape with circular cross-section can vary with the particular application, such that square, oblong, or other cross-sections can be embodied by the present invention. The present invention is thus not limited to the generally cylindrical shape.

Figure 1B:
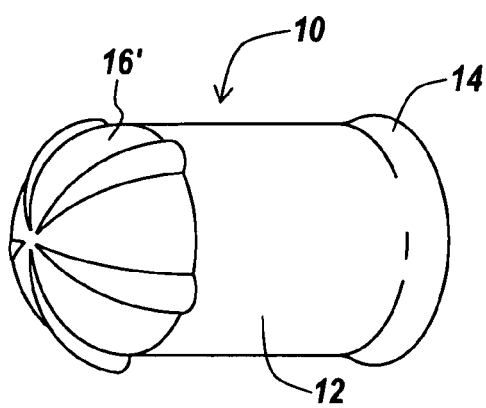
FIG. 1B is a perspective view of a pig device, according to an alternate aspect of the present invention.

The pig device 10 is formed of a main body portion 12 having a flanged end 14 at one end. The flanged end 14 increases the diameter dimension of the pig device 10 at the tip of the flange to perform a wiping function as later described herein. At an opposite end from the flanged end 14 the main body portion 12 supports a coating applicator 16. The coating applicator 16 can take numerous forms as required for application of a coating, including a compressible sponge-like arrangement illustrated in FIG. 1A. In an alternate embodiment, as illustrated in FIG. 1B, the coating applicator 16' can be a rigid substantially dome shaped end cap sized for insertion into a tube to be coated. The coating applicator 16 and 16' can be made of a number of different materials, including but not limited to plastics, composites, polymers, rubber, and the like. Additionally, the coating applicator can have a variety of physical properties associated with the coating applicator 16, 16', including the ability to be compressed slightly for insertion into a tube in accordance with the embodiment of FIG. 1A. In an alternate embodiment, as illustrated in FIG. 1B, the coating applicator can be manufactured of a dense material which is not readily compressible. One skilled in the art will readily recognize that there exist numerous variable physical properties associated with the coating applicator 16, 16' wherein these physical properties are dictated by the tube configuration and coating application requirements. As described later herein, the coating applicator 16, 16' spreads the coating onto the inner surface of a tube as a first step in a process for applying a coating and/or repairing pits or erosion elements in the tube.

Figure 2:
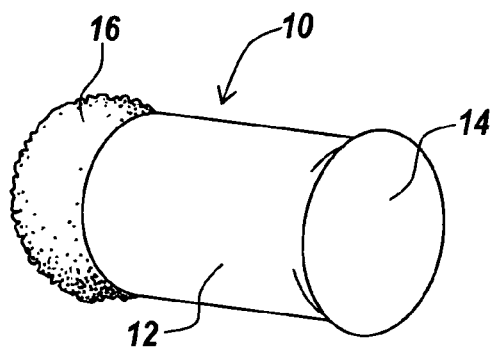
FIG. 2 is an alternate perspective view of the pig device, according to one aspect of the present invention.

FIG. 2 is a perspective illustration of the pig device 10 of FIG. 1, shown in a different angle perspective. As can be seen, the pig device 10 is shown as having no hollow inner cavities. However, one of ordinary skill in the art will appreciate that the primary purpose of the main body portion 12 of the pig device 10 is to provide a structure that can be pushed through a tube, not jam in the tube, and appropriately spread the coating as desired. Thus, the present invention is not limited to a solid structure, or even an enclosed structure, but can have hollow cavities in the pig device 10 to improve performance. The main body portion 12 can be made of a number of different materials, including but not limited to plastic, composite, metal, polymer materials, combinations thereof, and the like.

Figure 3:
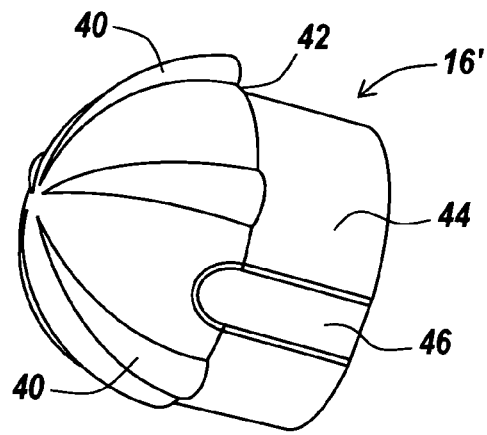
FIG. 3 is a perspective view of an end cap of the pig device, according to one aspect of the present invention.

FIG. 3 is a perspective illustration of the coating applicator 16' portion of the pig device 10. The coating applicator 16 of the present figure is included for illustrative purposes. In the present FIG. 3, the coating applicator 16 detailed is the same coating applicator 16' depicted in FIG. 1B. On skilled in the art will readily recognize, as recited earlier, the coating applicator may take numerous forms and shapes, and may be manufactured from a variety of compatible materials.

In the example illustration, the coating applicator 16' is a separate component from the main body portion 12 of the pig device 10. However, the coating applicator 16' and main body portion 12 can be a single component, as would be understood by one of ordinary skill in the art. The coating applicator 16' of the present FIG. 3 has several features, one of which is a series or plurality of ribs 40 extending from a base portion of the dome to the tip portion of the dome. The ribs 40 taper at the tip of the dome to end flush with the top of the dome. However, such a taper is not necessary for the implementation of the device.

Figure 4A:
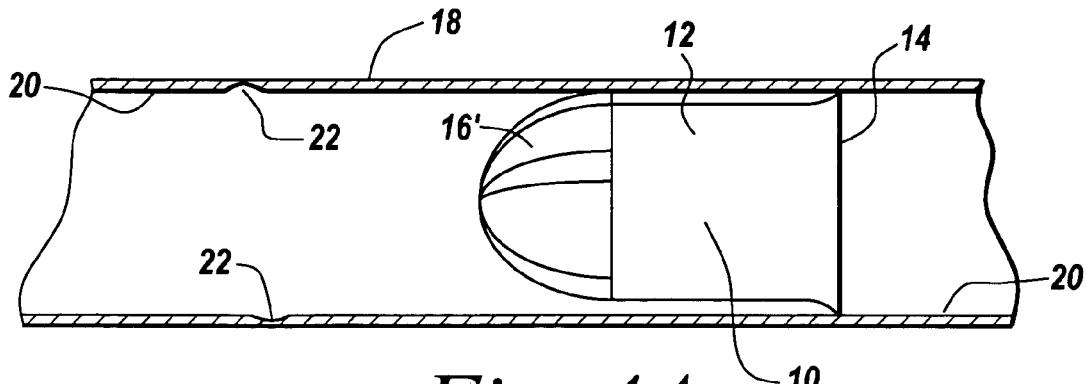
FIG. 4A is a diagrammatic illustration of the pig device in use in a tube, according to one aspect of the present invention.
Figure 4B:
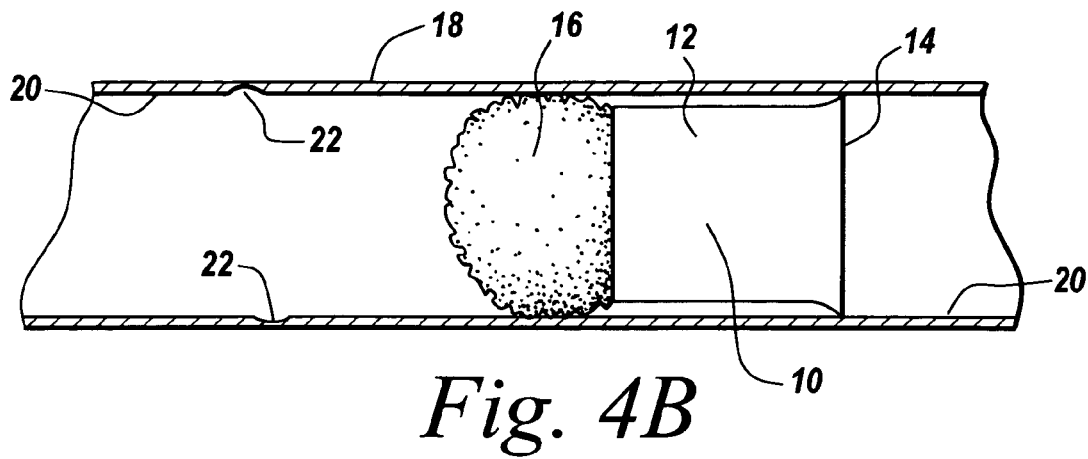
FIG. 4B is a diagrammatic illustration of the pig device in use in a tube, according to an alternate aspect of the present invention.

FIG. 4A is a diagrammatic illustration of the pig device 10 illustrated previously in FIG. 1B following insertion into a tube 18 or pipe. For clarity, the pig device 10 and attached coating applicator 16' of FIG. 1B have been used to illustrate the orientation of the pig device 10 when located within a tube 18 or pipe. The present embodiment, however, is not intended to be limiting in any manner, as one skilled in the art will readily recognize that a variety of pig devices and associated coating applicators can be similarly situated within the inner region of a tube 18 or pipe. For example, as illustrated in FIG. 4B, the pig device 10 and associated coating applicator 16 of FIG. 1A can be readily inserted into a tube 18 to apply a coating.

The tube 18 can be made of a number of different materials, such as metal, plastic, composite, ceramic, alloy, and the like. However in the case of heat exchanger tubes, the most common material currently utilized is copper alloy, stainless steel, or titanium alloys. The tube 18 has an inner surface 20 formed by the walls of the tube 18. In the example illustrated, the tube 18 includes erosion elements 22 (e.g., pitting, deterioration, erosion, corrosion, pin holes, and the like). The erosion elements 22 are representative of the types of defects that can occur in a heat exchanger, or other tube, over time. The erosion elements, as described above, can detract from the efficiency and effectiveness of the heat transfer by the tube 18, and can eventually lead to leak formation and cross-contamination of fluids (from inside the heat exchanger and outside the heat exchanger). Accordingly, there is often a desire to repair such an erosion element 22, or ultimately replace any tubes containing such erosion elements 22, to maintain tube performance.

Returning to FIG. 3, the rigid dome shape of the coating applicator 16 helps to evenly distribute the coating applied within the tube 18 or pipe as later described. One skilled in the art will readily recognize, however, that numerous alternative coating applicator 16 designs are applicable to the present invention, wherein these alternative coating applicators take a different shape or are manufactured from a different material as compared to the coating applicator illustrated herein.

The ribs 40 of the coating applicator provide centering and stabilizing functionality of the pig device 10 as it travels through the tube 18. The ribs 40 are sized and dimensioned to approximate an effective diameter of the pig 10 of slightly less than the inner diameter of the tube 18. For example, the effective diameter taken across the depth of one rib 40 and continuing along the remaining diameter of the coating applicator 16 measures approximately 0.4 mm less than an inner diameter of the tube 18 in accordance with one example embodiment of the present invention. One of ordinary skill in the art will appreciate that the exact dimension of 0.4 mm is not a limiting dimension. Rather, the sizing of the ribs 40 and the coating applicator 16 is such that the coating applicator 16 can slide through the tube 18 without being frictionally wedged inside the tube 18. Likewise, the effective diameter of the coating applicator 16 must be large enough to provide stability and prevent the pig device 10 from tumbling within the tube 18.

In the example embodiment, the ribs 40 are of a placement such that no two ribs diametrically oppose, or substantially diametrically oppose, each other. This feature is accomplished by positioning an odd number of ribs 40 evenly spaced around the circumference of the dome. However, there can be an even number of ribs 40 having different spacing dimensions between ribs 40 to result in the same effect of not having any two ribs diametrically opposed, or substantially diametrically opposed. If two ribs were diametrically opposed, the effective diameter of the coating applicator 16 would be significantly increased at the point of the opposed ribs 40 (the effective diameter would be the total sum of the applicator diameter plus the depth/thickness of both ribs). If two ribs 40 are diametrically opposed, such an arrangement increases the likelihood that the pig device 10 will hang up within a tube if, for example, one of the ribs passes over a raised imperfection on the inner surface of the tube that presses the diametrically opposed rib against the opposing wall of the tube, thus frictionally halting progress of the pig device 10 through the tube. Positioning the ribs 40 in a non-diametrically opposed configuration reduces the likelihood of such an occurrence.

The coating applicator 16' further includes a lip 42 that extends outward from a main body portion 44. The lip 42 extends for the circumference of the coating applicator around the base of the dome. The lip 42 is sized and dimensioned to abut the main body portion 12 of the pig device 10, such that when the coating applicator 16 is placed within the main body portion 12 of the pig device, the surface of the main body portion 12 is flush with the lip 42. Such a configuration creates a substantially smooth surface along the outside of the pig device 10, thus avoiding the collection of coating material at the point of intersection between the coating applicator 16' and the main body portion 12. Furthermore, the coating applicator 16' may be manufactured of a compressible material such that upon the application of a propulsion force on the pig device 10 the coating applicator 16' may compress allowing the coating to pass beyond the coating applicator 16'.

The diameter of the main body portion 44 of the coating applicator 16' is sized and dimensioned to fit snugly within the inner cavity of the main body portion 12 of the pig device 10. To aid in the combining of the coating applicator 16 with the main body portion 12, a flat 46 is provided on one side of the coating applicator 16. The flat 46 enables any air trapped within the main body portion 12 of the pig device 10 as the coating applicator 16 is assembled together with the main body portion 12 to escape. As such, the coating applicator 16' can more easily be mounted within the main body portion 12 of the pig device 10.

As mentioned, the main body portion 44 of the coating applicator 16' fits snugly within the main body portion 12 of the pig device. The fit can be a friction fit, holding the pieces together. Alternatively, adhesives or other mechanical bonding methods can be used, as understood by one of ordinary skill in the art, to couple the coating applicator 16' to the main body portion 12 of the pig device 10.

Figure 5A:
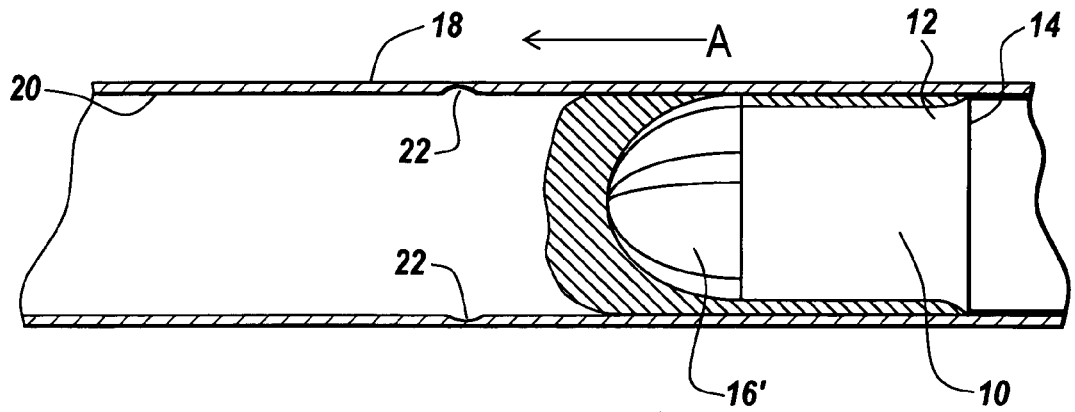
FIGS. 5A, 5B, 5C, 5D, and 5E are diagrammatic illustrations of the pig device in use, according to one aspect of the present invention.
Figure 5B:
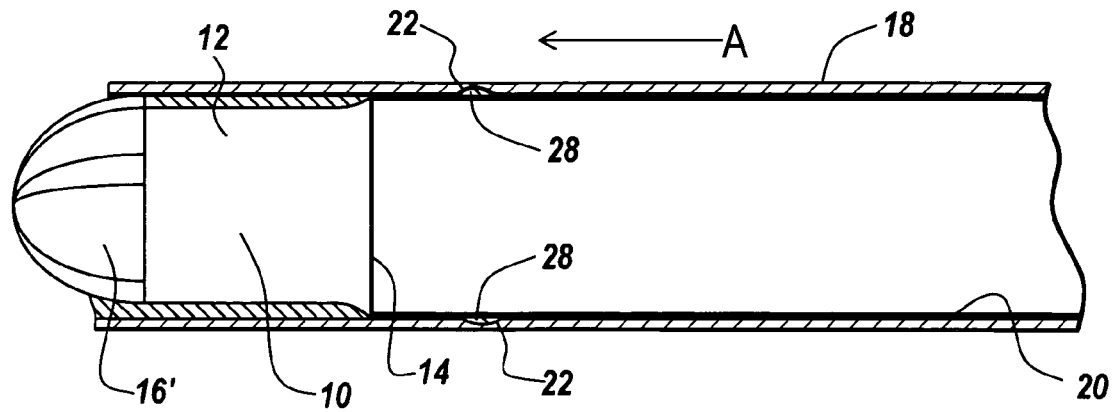
Figure 5C:
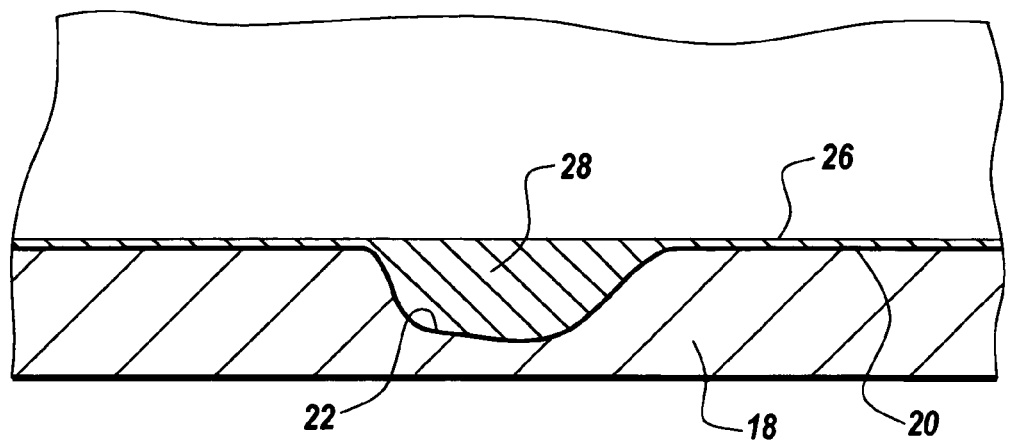

FIGS. 5A, 5B, and 5C illustrate the pig device 10 in use in conjunction with the tube 18, and also show the end result of a repair implemented by use of the present invention. In FIG. 5A, the pig device 10 using a solid coating applicator with associated ribs is shown at one end of the tube 18. As set forth prior, the use of the solid coating applicator 16, 16' with associated ribs is solely used as an illustrative example of the present invention. One skilled in the art will readily recognize that numerous alternative coating applicator arrangements are directly applicable to the present invention. These suitable alternative coating applicator 16, 16' designs and material selection can be based upon a variety of factors including but not limited to tube inner diameter, the coating in use, the proposed coating thickness, and the length of the tube 18 to be traversed by the pig device 10.

Prior to inserting the pig device 10 into the tube 18, a selected quantity of coating material 24 is placed in the tube 18. Alternatively, the coating material 24 can be placed on the end of the coating applicator 16 of the pig device 10. The amount of coating material 24 provided depends upon a number of factors, including the length of tube 18 to be coated, the thickness of the coating, the specific configuration of the pig device 10 being utilized to spread the coating material 24, the environment (such as humidity and temperature), the type of coating material 24 and associated coating properties (such as viscosity), and the like. Example materials forming the coating material 24 include but are not limited to epoxies, phenolics, vinal esters, poly esters, urethanes, other polymers, and other coating materials. The specific type of coating material utilized will depend largely on the purpose of the coating and the environment in which it is applied and to be maintained, as understood by one of ordinary skill in the art. For example, the coating material may contain numerous additives to improve performance of the tube or reduce further problems. A non-exhaustive list of suitable additives includes waxes, silicones, and other dry lubricants such as molybdenum disulfide.

Furthermore, to combat the growth of biological organisms along the inner surface of the tube, various algicides, biocides and fungicides can be added to the coating which kill or deter the growth of these organisms. Growth of biological organisms such as algae, fungi, bacterial and other micro organisms along the inner surface of the tube may result in fouling of the tube surface as well as the creation of obstructions within the tube. Fouling and obstructions such as this can reduce heat transfer within the tube as well as restrict or prohibit fluid flow. Furthermore, the existence of biological growth can further induce various types of corrosion along the tube wall, thereby resulting in deterioration and eventual tube failure. The introduction of algicides, biocides and fungicides into the coating material thereby serves to prevent or minimize such problems. Suitable substances for curbing biological growth include, but are not limited to ortho-phenylphenol (OPPS); isothiazolinone derivatives (such as 2-n-octyl-4-isothiaszolin-3-1 (OIT); guanides and biguanides; carbamates and dithiocarbamates; copper, sodium or zinc pyrithione; benz-imidazoles; n-haloalkylthio compounds; 1-(3-chloroallyl)-3,5,7-tri-aza-1-azionia-adamantanechloride; tetrachloroisophthalonitriles; cis[1-(3-chloroallyl)-3,5,7-tri-aza-1-azonia-adamantane]chloride and 2,2-dibromo-3-nitropropionamide (DBNPA); and quaternary ammonium compounds.

Additionally, the coating materials of the present invention may be of varying viscosity. Unlike traditional coating methods, wherein the coating material is sufficiently thinned using a solvent, the coating of the present invention may be used in an un-thinned high viscosity state. The use of a thinning solvent aids in the flow of existing coating throughout the tube and helps control cure time properties. Following the coating of tube with a thinned coating, one must await the evaporation of the solvent from the coating material for the coating to cure. As heat exchanger tubing has a very low diameter to length ratio to maximize surface area for heat transfer, this confined space oftentimes makes it difficult for a solvent to migrate Further compounding this difficulty are any pits in the tube wall which may be filled with the solvented coating, whereby the likelihood that some solvent may be trapped in these pits is greatly increased.

In contrast, as the coating in the present invention is pushed through the tube, coating with higher initial viscosities can be used in an un-thinned state. For example, coatings with viscosities of 100,000 cps or greater can be readily used. In light of this, the risks associated with incomplete solvent removal are eliminated.

As shown in FIG. 5B, the pig device 10 is pushed along the tube 18 in the direction of arrow A, leaving behind a coating 26 formed of a thin layer of the coating material 24. The direction of the pig device 10 passing through the tube 18 is inconsequential to the implementation of the invention so long as the pig device 10 leads with the coating applicator 16, 16'. To describe the action of the pig device 10, the following is provided. The coating material 24 collects around the coating applicator 16, 16'. This action is due to drag and frictional forces pushing the coating material 24 into the pig device 10 as it travels through the tube 18. As the pig device 10 moves through the tube 18, the spaces between the ribs 40 of the coating applicator 16, in one embodiment, let an amount of the coating material 24 pass by the coating applicator 16 and collect along the main body portion 12 of the pig device 10, between the main body 12 and the inner surface 20 of the tube 18 before the flanged end 14. As the pig device 10 continues in the direction of arrow A, the flanged end 14 comes along and wipes the coating material 24 to form the coating 26. In the other example embodiment, as the pig device 10 moves through the tube, the coating applicator 16 compresses thereby allowing the passage of coating material past the region defined by the coating applicator.

Even distribution of the coating material 24 is accomplished by the combination of the coating applicator 16, 16' controlling the initial amount of coating material 24 being let into the region between the main body portion 12 and the action of the flanged end 14 wiping against the inner surface 20. As set forth prior, one skilled in the art will readily recognize that the coating applicator 16 and 16' may take numerous forms and may be manufactured of a variety of materials. Regardless of material selection or coating applicator 16 forms, the coating applicator must be capable of passing a predetermined amount of the coating past the coating applicator 16, 16' and into the region defined by the main body portion 12 and the flanged end 14.

In the instance of the existence of the erosion element 22, the pig device 10 can be used to provide a coating patch 28. In short, the coating material 24 is controlled by the coating applicator 16, 16' to the extent that a sufficient amount is available to fill the erosion element 22 in the form of a pit or imperfection as it exists in the tube 18 and as the pig device 10 comes across the pit or imperfection. As the pig device 10 passes over the erosion element 22, the coating material 24 fills in any voids. Then as the flanged end 14 passes over the erosion element 22, any excess coating material 24 is wiped away leaving sufficient material to form the coating patch 28, filling the erosion element 22. In areas on either side of the erosion element 22 the coating 26 is applied to the inner surface 20.

In accordance with one example, a propulsion mechanism such as a compressed gas or liquid can be used in pushing the pig device 10 along the length of the tube 18. In the exemplar embodiment, this propulsion mechanism is applied at the flange end 14 of the pig device 10. As the propulsion mechanism is applied, the pig device 10 is motivated through the tube 18 to a far end. Depending on the particular tube configuration, the pig device 10 can continue, through a connector, to another tube, or alternatively exit the tube 18. One of ordinary skill in the art will appreciate that the propulsion mechanism used in motivating the pig device 10 along the length of the tube 18 may take numerous forms. Such propulsion mechanisms include, but are not limited to, compressed gases, liquids, and the like, a pressure differential such as a vacuum, as well as a rod-like structure that can be used to manually push the pig device 10 through the tube. Applicant has found the compressed propellant to be the most effective at this time; however other propelling devices or forces can be utilized to move the pig device 10 through the tube.

In addition, the pig device 10 can be pulled through the tube 18 by a line, such as a wire, string, tape, rod, and the like, made of any number of different materials, including synthetic, non-synthetic, metal, plastic, composite, woven, non-woven, etc. Accordingly, the present invention is not limited by the particular material or structure of the device utilized to pull the pig device 10 through the tube 18. Alternatively a negative pressure differential can be employed to pull the pig device 10 along the length of the tube 18.

The use of the pig device 10 provides a user with added control over the dimensions of the resulting coating 26. More specifically, the pig device 10, by varying such portions as the coating applicator 16, 16' and the end flange 14, can be modified to specifically result in a desired coating having a predetermined and substantially consistent thickness and distribution. For example, the coating applicator 16, 16' can be varied by material, size or shape to let selected amounts of the coating material to pass by for application. In addition, the diameter or width of the main body portion 12 can be varied to control the amount of coating material 24 being exposed to the end flange 14. In addition, the dimensions and shape of the end flange 14, and of the main body portion 12, can be varied to control the distribution and amount of material being deposited on the inner surface 20.

The configuration of the pig device 10, with the wiping action of the end flange 14, enables substantially improved control over the coverage and thickness of the coating 26. In accordance with one embodiment of the present invention, coatings having a thickness on the order of less than 0.25 mils can be achieved using the pig device 10 of the present invention. This results in the ability to provide a coating that has a substantially reduced effect on heat transfer properties of the tube where the coating covers the inner surface in areas of otherwise good condition, while also repairing pits and other erosion elements 22. Thus, the overall effect of use of the pig device 10 of the present invention on a tube in otherwise good condition is to provide a coating of thickness much smaller than past processes, with minimal heat transfer effect, but improved durability and ability to repel corrosion and other fouling or deteriorating elements. The overall effect of use of the pig device 10 of the present invention on a tube having erosion elements 22 that are detracting from tube performance is to repair and renovate the tube to restore the tube to a much improved condition, delaying the need to shut down the system and replace the tube. Additionally, the present invention can be utilized in coating a tube 18 which does not suffer from erosion elements or fouling, wherein the resulting coating is of minimal thickness. Such a uniform coating using the present invention is beneficial in industrial applications where the material the existing tube is manufactured from is incompatible with the proposed fluid for use within the existing tube. In a refrigeration setting, for example, a common copper heat exchanger that is in working order can be coated using the present invention such that a thin coating is uniformly applied to all regions of the interior of the heat exchanger tubes. This uniform coating covers all exposed copper surfaces along the interior of the tube. Following such a coating, a refrigerant that is otherwise incompatible with copper tubing can now be used, as the interior of the heat exchanger tubes no longer have any regions of exposed copper. One skilled in the art will readily recognize that this is solely an illustrative example of a use of the present invention in providing an inner surface of a tube which is compatible with the intended working fluid contained by the tube. Such an example is clearly not exhaustive of the potential used of recoated tubes.

Figure 5D:
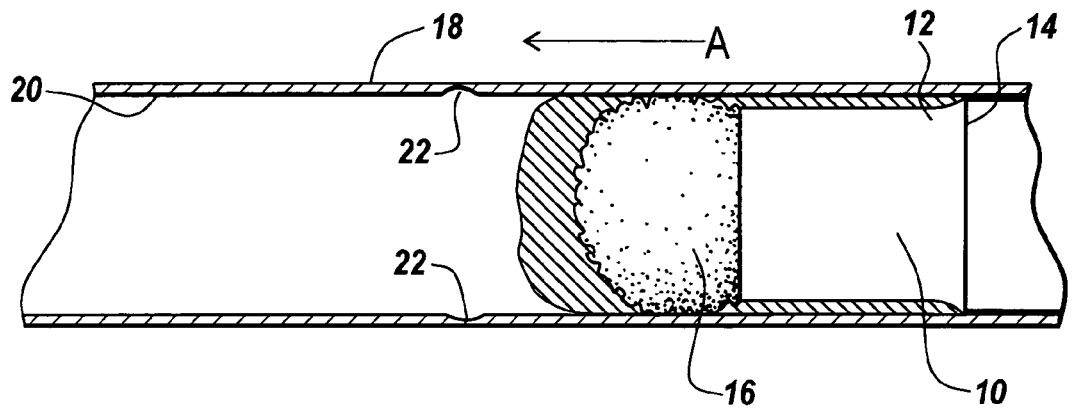
Figure 5E:
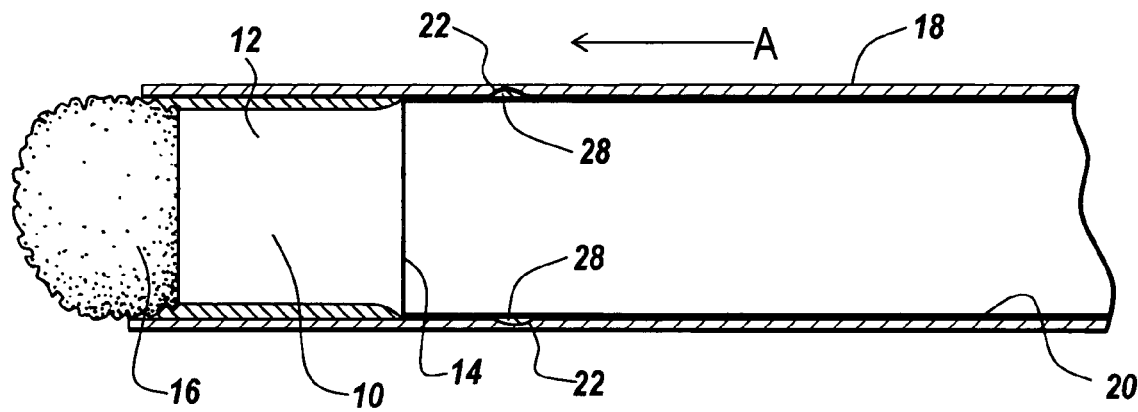

FIGS. 5D and 5E illustrate an alternate embodiment of the pig device when used with the compressible coating applicator 16. This illustrative example is an alternate embodiment of the present invention and is not intended to limit the scope of the present invention. In FIG. 5D, the pig device 10 is shown at one end of the tube 18 wherein a selected quantity of coating material 24 has already been placed in the tube 18. As set forth prior, the amount of coating material 24 provided depends upon a number of factors relative to the specific application.

As shown in FIG. 5E, the pig device 10 is pushed along the tube 18 in the direction of arrow A, leaving a uniform coating 26 behind In the present embodiment, the coating material 24 collects around the coating applicator 16. This action is due to drag and frictional forces pushing the coating material 24 into the pig device 10 as it travels through the tube 18. As the pig device 10 moves through the tube 18, the coating applicator 16 of the present embodiment retracts or compresses sufficiently to let an amount of the coating material 24 pass by the coating applicator 16 and collect along the main body portion 12 of the pig device 10, between the main body 12 and the inner surface 20 of the tube 18 before the flanged end 14. As the pig device 10 continues in the direction of arrow A, the flanged end 14 comes along and wipes the coating material 24 to form the coating 26. The use of a compressible coating applicator 16, as illustrated in the present embodiment, as well as the rigid coating applicator with associated ribs of FIG. 5A is not an exhaustive list of potential coating applicator embodiments. One skilled in the art will readily recognize that numerous alternative coating applicator 16 embodiments exist which are applicable to the present invention. These alternative embodiments may take numerous forms or shapes, and may be constructed from a variety of materials suitable for applying a coating.

Figure 6:
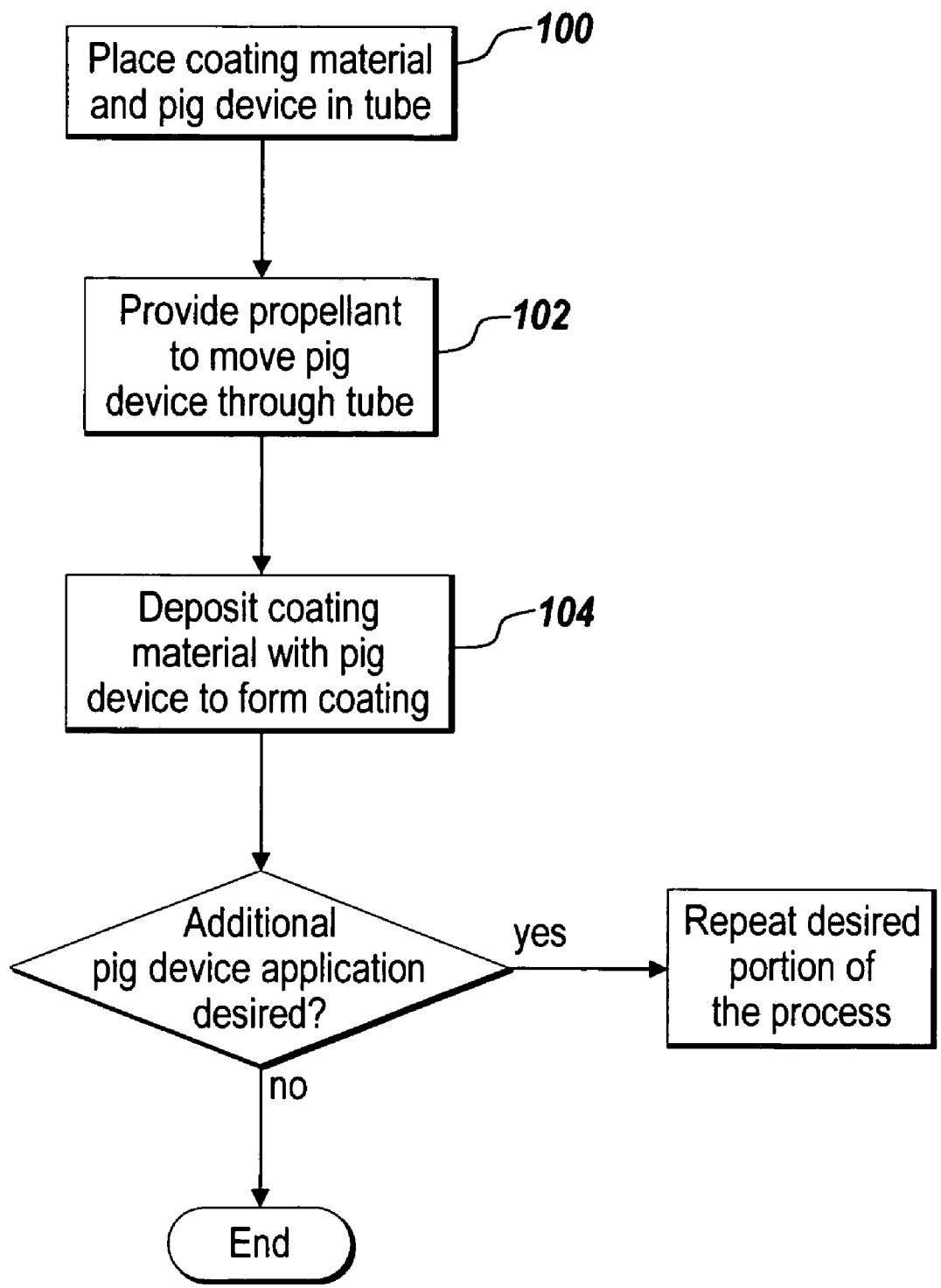
FIG. 6 is a flowchart illustrating one method of use of the pig device, according to one aspect of the present invention.

FIG. 6 is a flowchart illustrating one example method of using the pig device 10 in accordance with one embodiment of the present invention. The coating material 24 and pig device 10 are provided in the interior portion of the tube 18 (step 100). The propellant is provided, blowing the pig device 10 through the tube 18 (step 102). As the pig device 10 travels along the tube 18, the coating material 24 is deposited on the inner surface 20 of the tube 18 to form the coating 26 (step 104). If desired, the process can be repeated to provide additional layers of coating material 24 (step 106). It should be noted that if additional layers of coating material 24 are applied, the layers can be formed of coating material 24 that is of a different type, or the same as the initial coating material 24. In addition, if the process is repeated, different pig devices 10, having different properties or characteristics can be used to form coating layers having different properties. Furthermore, depending on the coating material 24, time may be required to allow for the coating to set and cure.

FIGS. 7A-F illustrate several example alternative embodiments of the pig device 10 in the form of pig devices 10A-10F. Pig devices 10A and 10 D have the additional aspects of longitudinal surface features 30. Pig devices 10B and 10E have the additional aspects of latitudinal surface features 32. The addition of the longitudinal surface features 30 and latitudinal surface features 32 are representative of a variety of different alternative embodiments in which the surface of the main body portion 12 is modified to have an impact on the distribution of the coating material 24 by the pig device. One of ordinary skill in the art will appreciate that different orientations and combinations of surface features, coating applicator arrangements (i.e. shape, material selection and compressibility), in addition to others not specifically described or illustrated, are possible in accordance with the present invention. Accordingly, the present invention is not limited to only the example embodiments illustrated.

Figure 7A:
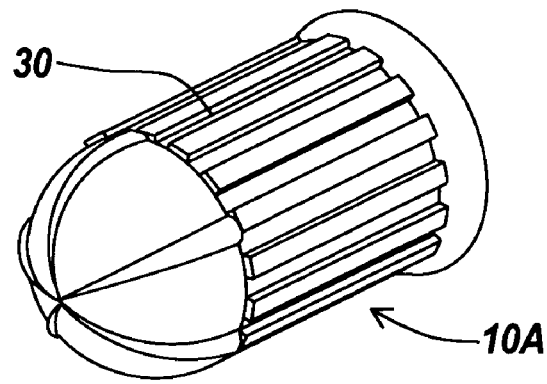
FIGS. 7A, 7B, 7C, 7D, 7E and 7F are perspective illustrations of alternative pig device embodiments, according to aspects of the present invention.
Figure 7B:
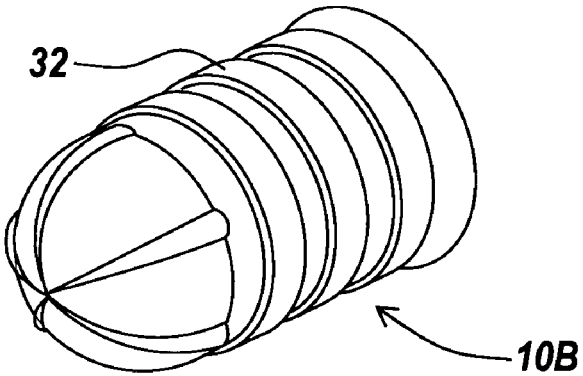
Figure 7C:
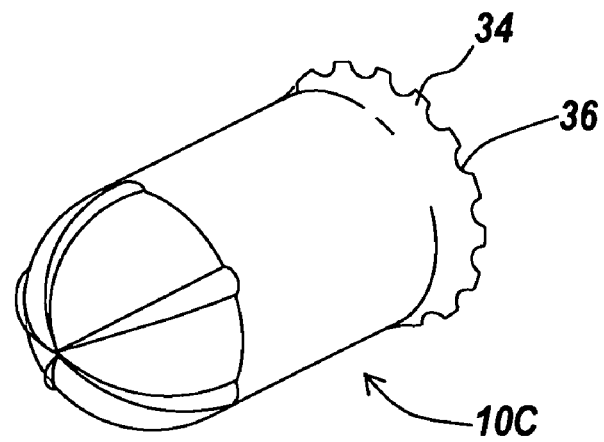
Figure 7D:
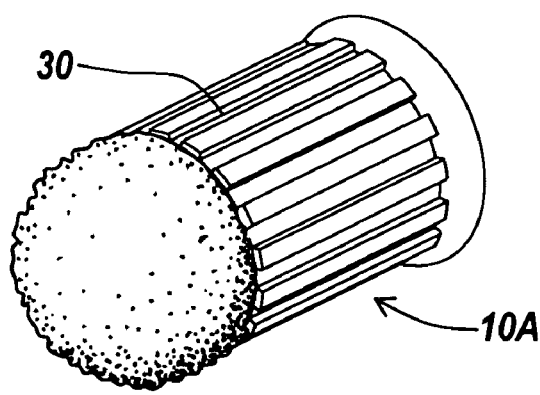
Figure 7E:
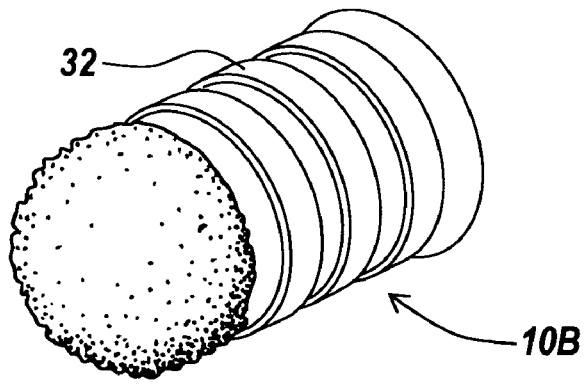
Figure 7F:
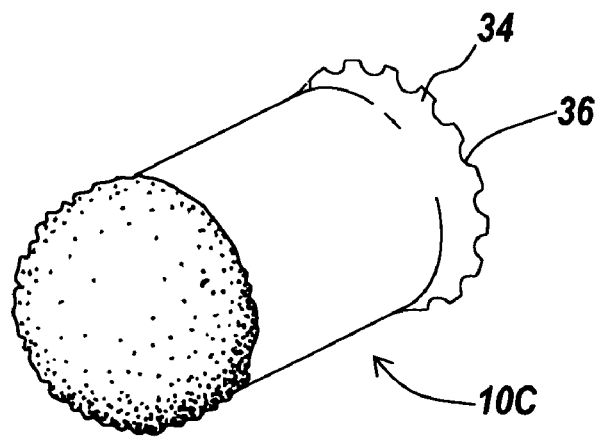

In FIGS. 7C and 7F, an end flange 34 of pig device 10C includes a plurality of valleys 36. As the flange 34 passes over the coating material 24, the valleys 36 in the flange 34 form ridges in the coating 26 that results on the inner surface 20 of the tube 18. The particular pattern resulting in the coating 26 can vary, as understood by one of ordinary skill in the art, based on the shape of the flange. Such a flange 34 can be useful if multiple passes of the pig device are to be implemented. The first application of the coating material 24 can have the primary purpose of depositing the coating material 24 in a predetermined pattern of ridges, while subsequent passes of the pig device can smooth out, or otherwise modify, the resulting coating. Alternatively, the ridges or other patterns formed in the coating can form the final configuration of the coating, if such ridges or patterns are desired.

Initial implementations of the pig device 10 to provide a coating in a tube 18 have resulted in a coating of approximately 0.25 mils to 1 mil thickness that provided consistent coverage of the inner surface 20. Heat transfer analysis of the coated tube revealed minimal effect on heat transfer properties. Tubes having one or more pits were quickly repaired by use of the pig device 10 and an epoxy coating to patch the pits with a durable patch, thus extending the work life of the tube.

Accordingly, the present invention is useful in that the implementation of the pig device to apply a coating or a coating patch enables substantially improved control over the coverage and thickness of a coating on an inner surface of a tube. Where prior methods have resulted in a minimum coating thickness of 2 mils to 5 mils, the present invention can achieve a much thinner coating, on the order of 0.25 mils to 1 mil. Thus, the resulting coating has far lesser negative effects on heat transfer properties of the tube. In addition, the pig device can be run through the tube multiple times to provide layers of coating if a more durable, or thicker coating is desired. The compressed fluid in the form of gas or liquid quickly propels the pig device through the tube, efficiently applying the coating to the inner surface.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

What is claimed is:

1. A pig device for use in the application of a coating material to a tube, comprising:
    a main body portion;
    a coating applicator disposed at a first end of the main body portion, said first end being the end of said pig that is first inserted into a tube to be coated, said coating applicator having a substantially dome shaped exterior and having a plurality of spaced apart longitudinally extending, curved ribs located on said dome shaped exterior and curved ribs extending from a base portion of said exterior to a tip portion of said exterior, said ribs enabling the passage of a coating beyond the coating applicator;
    an end flange disposed at a second end of the main body portion, wherein said end flange forms a continuous, solid edge extending without interruption around a periphery of said second end of said main body portion, said solid edge being capable of forcing a coating material into erosion elements and pits in an inner surface of said tube while wiping away excess coating material to result in a thin, single layer coating formed on said inner surface of the tube, said thin, single layer coating is sufficiently thin so as to not significantly inhibit heat transfer capabilities of the tube.

2. The pig device of claim 1, wherein the pig device is configured to be motivated along the length of the tube by a propulsion mechanism.

3. The pig device of claim 2, wherein the propulsion mechanism motivates the pig device along the length of the tube using one of a pressure differential or a mechanical means.

4. The pig device of claim 3 wherein the mechanical means for propulsion is a pull cord.

5. The pig device of claim 3, wherein the propulsion mechanism is a compressed fluid.

6. The pig device of claim 1, wherein the surface of the pig device is sized and orientated to control application of the coating material.

7. The pig device of claim 1, wherein the coating formed on the inner surface of the tube is one of an epoxy, phenolic, vinal ester, poly ester, urethane, or polymer.

8. The pig device of claim 1, wherein the coating formed on the inner surface of the tube includes an additive for use in coating the tube.

9. The pig device of claim 8, wherein the additive is one of a biocide, fungicide or algaecide.

* * * * *